3,062,713
STEROID HORMONE COMPOSITIONS AND METHOD OF USING SAME
Pietro de Ruggieri and Carlo Ferrari, both of Via Chioggia 2, Milan, Italy
No Drawing. Filed Dec. 27, 1960, Ser. No. 78,252
Claims priority, application Italy Oct. 18, 1960
7 Claims. (Cl. 167—53)

This invention relates to the therapeutic application of a new steroid, 17α-vinyl-5(10)-estren-17β-ol-3-one (vinyl-estrenolone) both for humans and in veterinary medicine.

17α-vinyl-5(10)-estren-17β-ol-3-one is prepared as follows:

0.125 part of lithium in small pieces is added, little by little, to 100 parts of liquid ammonia in the presence of one crystal of ferric nitrate; a blue color develops, which disappears after about 20 minutes owing to the formation of the lithium-amide. A solution of 1 part of 3-methoxy-17α-ethynyl-1,3,5(10)-estratriene-17β-ol in 50 parts of anhydrous diethyl ether is then added over a period of 30 minutes, and the suspension is stirred for an additional 90 minutes; thereafter 1 part of lithium in small pieces is added over a period of about 20 minutes and stirring is continued for another 30 minutes. The resulting solution is then carefully treated with absolute ethanol over a period of 20 minutes, after which the ammonia is evaporated and the residue, diluted with water, is extracted with diethyl ether. The ethereal extract, washed with water and dried over sodium sulphate is evaporated to dryness.

The residue, dissolved in 90 parts of methanol, is treated for 40 minutes at 25° C. with 1.3 parts of bihydrated oxalic acid in 16.5 parts of water.

After diluting with water, the solution is repeatedly extracted with diethyl ether, the combined extracts are washed with aqueous sodium bicarbonate followed by water, dried over sodium sulphate and evaporated to dryness. The crystallization of the residue from diethyl ether hexane is productive of 0.8 part of 17α-vinyl-5(10)-estrene-17β-ol-3-one with a melting point of 142–143° C., an optical rotation of +161° (chloroform) and the analysis given below:

Found, percent: C, 79.86; H, 9.42. For $C_{20}H_{28}O_2$ calcd.: C, 79.95; H, 9.39.

The drug has been resorted to in humans in the treatment of dysmenorrhea, menopausal disturbances, fecundation control in cases of hindered normal pregnancy (renal lesions, etc.); it has also been used in the case of women engaged in athletics when it would be advisable to delay their menstrual period.

Its anti-gonadotropic effectiveness has proven to be very high as compared with similar compounds, and it has been found to be completely devoid of any undesirable side-effects.

In this regard the following tables show the pro-pregnancy effectiveness of the present compound as compared with progesterone and 17α-ethinyl-5(10)-estren-17β-ol-3-one (ethinyl-estrenolone) in the Glauberg test its androgenic and assimilation effectiveness as determined by Heshberger's test in comparison with testosterone propionate and ethinylestrenolone, and its oestrogenous effectiveness as determined by Lauson's test in comparison with oestradiol monobenzoate and ethinyl-estrenolone:

PRO-PREGNANCY EFFECTIVENESS OF VINYL-ESTRENOLONE

| Group and injectable products | No. animals | Body weight, g. | Sub-cutaneous total dose | | McPhail's Rate |
|---|---|---|---|---|---|
| | | | Before treat. | Treat., mg. | |
| Control | 2 | 920 | | | |
| Progesterone | 3 | 950 | 2.5γ oestradiol | 2 | 3+4+ |
| Vinylestrenolone | 3 | 840 | 2.5γ oestradiol | 2 | 1+± |
| Ethinylestrenol | 2 | 900 | 2.5γ oestradiol | 2 | 1+1+ |

ANDROGENIC AND ASSIMILATION EFFECTIVENESS OF VINYL-ESTRENOLONE

| Groups and injectable products | Body weight before tr., g. | Body w. after treatment, g. | M. lev. ani., mg. | Prostate, mg. | Semin. Vesicles, mg. | M. lev. ani. Prostate Ther. Rate |
|---|---|---|---|---|---|---|
| Castrated controls | 35.3 | 49.7 | 6.9 | 15.3 | 6.7 | |
| Testosterone propionate, 500γ | 35.3 | 50.0 | 32.0 | 101.4 | 120.6 | 0.29 |
| Testosterone propionate, 100γ | 35.0 | 47.1 | 27.4 | 98.1 | 101.1 | 0.24 |
| Vinyl-estren. 500γ | 35.0 | 43.8 | 8.1 | 13.3 | 23.1 | |
| Vinyl-estren., 100γ | 35.0 | 41.3 | 9.0 | 26.9 | 25.6 | 0.18 |
| Ethinylestrenolone, 500γ | 35.0 | 44.1 | 9.4 | 17.4 | 18.5 | |

VINYL-ESTRENOLONE OESTROGENOUS EFFECTIVENESS

| Group and injected product | Number of rats | Initial body weight, g. | Final body weight, g. | Weight of uterus, mg. | Weight of uterus, 100 g.p.c. |
|---|---|---|---|---|---|
| Control | 10.0 | 35.5 | 49.2 | 23.7 | 48.3 |
| Oestradiol m.b.: | | | | | |
| 0.2γ | 10.0 | 35.3 | 48.5 | 87.5 | 180.4 |
| 0.1γ | 10.0 | 35.3 | 46.1 | 47.6 | 103.2 |
| 0.05γ | 10.0 | 35.2 | 45.6 | 30.7 | 67.3 |
| Vinyl-estrenolene: | | | | | |
| 20γ | 10.0 | 35.4 | 45.1 | 79.2 | 175.6 |
| 10γ | 10.0 | 35.3 | 47.0 | 60.9 | 129.5 |
| 5γ | 10.0 | 35.2 | 45.4 | 44.9 | 98.8 |
| Ethinyl-estren.: | | | | | |
| 20γ | 10.0 | 35.3 | 47.5 | 101.3 | 213.2 |
| 10γ | 10.0 | 35.2 | 47.1 | 96.9 | 205.7 |

The data recorded in the tables show that the oestrogenous effectiveness of the drug is very low, amounting to approximately ⅓ of that displayed by ethinyl-estrenolone. More over, as is the case with ethinyl-estrenolone, poor pro-pregnancy efficacy is shown and scarcely any androgenic and assimilative effect can be observed.

This undoubtedly results, especially in the therapeutic field, in a considerable advantage favoring the new steroid as compared with ethinyl-estrenolone, when one considers that the lower the side-effects are in an active compound, the more valuable it is for its intended specific use.

*Clinical results.*—Clinical experimentation has been carried out with vinyl-estrenolone in 52 women ranging in age from 25 to 55 years, divided into groups as follows:

| | No. cases treated | Posology daily dosage, in mgs. | Administr. route | Duration | Results | | |
|---|---|---|---|---|---|---|---|
| | | | | | Positive | Partial | Negative |
| Dysmenorrhea | 18 | 2.5–10 | Peroral Inject | 3 weeks after cessation of menses | 13 | 2 | 3 |
| Pre-Menstrual Tension | 14 | 2.5–10 | ----do---- | 5–7 days before menses | 10 | | 4 |
| Menopausal Disturbances | 20 | 10–40 | ----do---- | 20–30 days | 15 | 2 | 3 |

As regards contraceptive effectiveness, the drug has been tested in 4 women, three of whom suffered from renal lesion and one with uterine malformation, at a posology of 5 to 10 mg. daily from the 5th to the 25th day, for three consecutive cycles, with favorable results in all four cases under consideration.

For delay of menstruation in women engaged in athletic events: 5 mg. a day starting from 5 days before beginning of menses up to 2 days before wanted menstruation.

Side-effects: Out of approximately 60 cases treated only 5% exhibited gastric intolerance and in no case was there observed any masculinizing effect from the use of the drug.

Pharmaceutical preparations of the drug have been produced for intramuscular injection by dissolving the steroid in an oily vehicle such as teel oil, olive oil, oleic acid esters, and for oral administration by tabletting it in admixture with an inert carrier.

As exemplary of preparations designed for administration by intramuscular injection, there may be mentioned 1 cc. ampuls filled with 10 mg. of vinyl-estrenolone dissolved in olive oil and
2 cc. ampuls filled with 25 mg. of the drug dissolved in olive or similar pharmaceutically acceptable fatty oils.

As exemplary of tablets intended for oral administration, the following formulas are set forth:

*Formula I*

| | Mg. |
|---|---|
| Vinyl-estrenolone | 5 |
| Lactose | 103 |
| Rice starch | 30 |
| Magnesium stearate | 7.5 |
| Talc | 4.5 |

*Formula II*

| | Mg. |
|---|---|
| Vinyl-estrenolone | 10 |
| Lactose | 98 |
| Rice starch | 30 |
| Magnesium stearate | 7.5 |
| Talc | 4.5 |

A pharmaceutical composition for veterinary use does not differ materially from that meant for humans, with the exception of the steroid dosages. Examples of the most used veterinary compositions are set forth as follows.

Ampuls: 25 mg. in 2 cc. olive oil or other oily solvent.

Tablets:

| | Mg. |
|---|---|
| Vinyl-estrenolone | 3 |
| Lactose | 105 |
| Rice starch | 30 |
| Magnesium stearate | 7.5 |
| Talc | 4.5 |

The following examples are set forth as being further exemplary of but not as limiting the present invention:

EXAMPLE NO. 1

Tablets: 5 parts of vinyl-estrenolone are powdered finely so that it will pass a 120 mesh/sq. cm. screen, then mixed gradually with 103 parts lactose and 15 parts rice starch. 15 parts of rice starch are suspended separately in and heated with 150 parts of water to effect homogeneous distribution. The hot mixture is poured into the hormone-lactose-starch mixture and thoroughly kneaded. The resulting production, then granulated and dried at 50° C., granulated again and sieved through a 4–5 mesh/sq. cm. sieve.

The sieved preparation is poured into a mixer and there is added 7.5 parts of magnesium stearate and 4 parts of talc. After 45 minutes, the preparation is transferred to a pressing-machine which manufactures 150 mg. tablets which have a diameter of 8 mm. and a central furrow.

Ampuls: 10 parts of vinyl-estrenolone are dissolved in 25 parts benzylbenzoate and 0.2 part chloretone with heating and constant shaking. The mixture is then cooled to room temperature and there is added sufficient pure olive oil, as used for sub-cutaneous injection, to bring to 1000 parts. The mixture is filtered at a temperature of 50° C. through filter paper to cause it to be absolutely clear.

The preparation is finally cooled to room temperature and poured into 1 cc. dose ampules. After sealing, the ampules are sterilized in an autoclave at 120° C.

The ratios set forth above may be varied in accordance with the posology previously mentioned.

The present application is a continuation-in-part application of our application Ser. No. 736,458, filed May 20, 1958, now U.S. Patent No. 2,983,735.

We claim:

1. A pharmaceutical composition in dosage unit form for intramuscular injection comprising from 2.5 to 40 mg. of $17\alpha$-vinyl-$5(10)$-estren-$17\beta$-ol-3-one together with a non-toxic fatty oil.

2. A pharmaceutical composition in dosage unit form for oral administration comprising a tableted mixture of from 2.5 to 40 mg. of $17\alpha$-vinyl-$5(10)$-estren-$17\beta$-ol-3-one and a non-toxic inert solid pharmaceutical carrier, said carrier being present in the major proportion.

3. A pharmaceutical composition in dosage unit form consisting of the following ingredients in approximately the amounts stated:

| | Mg. |
|---|---|
| $17\alpha$-vinyl-$5(10)$-estren-$17\beta$-ol-3-one | 5 |
| Lactose | 103 |
| Rice starch | 30 |
| Magnesium stearate | 7.5 |
| Talc | 4.5 |

4. A pharmaceutical composition in dosage unit form consisting of the following ingredients in approximately the amounts stated:

| | Mg. |
|---|---|
| $17\alpha$-vinyl-$5(10)$-estren-$17\beta$-ol-3-one | 10 |
| Lactose | 98 |
| Rice starch | 30 |
| Magnesium stearate | 7.5 |
| Talc | 4.5 |

5. A therapeutic composition in dosage unit form comprising 10 mg. of 17α-vinyl-5(10)-estren-17β-ol-3-one dissolved in olive oil.

6. A therapeutic composition in dosage unit form comprising 25 mg. of 17α-vinyl-5(10)-estren-17β-ol-3-one dissolved in olive oil.

7. A process for conducting steroid therapy in a female patient comprising administering daily to said patient from 2.5 mg. to 40 mg. of 17α-vinyl-5(10)-estren-17β-ol-3-one.

References Cited in the file of this patent

UNITED STATES PATENTS

| | | |
|---|---|---|
| 2,905,676 | Colton | Sept. 22, 1959 |
| 2,920,999 | Agnello et al. | June 12, 1960 |